US011556159B2

(12) United States Patent
Pan et al.

(10) Patent No.: US 11,556,159 B2
(45) Date of Patent: Jan. 17, 2023

(54) RATED POWER SUPPLY SYSTEM POWERED BY POWER OVER ETHERNET

(71) Applicant: Antaira Technologies, LLC, Brea, CA (US)

(72) Inventors: Woody Pan, New Taipei (TW); Jack Tsai, New Taipei (TW)

(73) Assignee: Antaira Technologies, LLC, Brea, CA (US)

( * ) Notice: Subject to any disclaimer, the term of this patent is extended or adjusted under 35 U.S.C. 154(b) by 7 days.

(21) Appl. No.: 17/475,553

(22) Filed: Sep. 15, 2021

(65) Prior Publication Data

US 2022/0244769 A1    Aug. 4, 2022

(30) Foreign Application Priority Data

Jan. 29, 2021   (TW) .................... 110103489

(51) Int. Cl.
 *G06F 1/26*       (2006.01)
 *G06F 1/3206*    (2019.01)
 *G06F 1/3296*    (2019.01)
(52) U.S. Cl.
 CPC ............ *G06F 1/266* (2013.01); *G06F 1/3206* (2013.01); *G06F 1/3296* (2013.01)

(58) Field of Classification Search
 CPC ....... G06F 1/266; G06F 1/3206; G06F 1/3296
 See application file for complete search history.

(56) References Cited

U.S. PATENT DOCUMENTS

| 8,676,393 B1 * | 3/2014 | Hupton ................ H02J 3/14 |
| | | 700/291 |
| 2018/0375673 A1 * | 12/2018 | Wendt .................. H04L 12/10 |

* cited by examiner

*Primary Examiner* — Kim Huynh
*Assistant Examiner* — Cory A. Latham
(74) *Attorney, Agent, or Firm* — Karin L. Williams; Alan D. Kamrath; Mayer & Williams PC (57) ABSTRACT

A rated power supply system powered by PoE receives power from external power sources and supplies power to PDs. The system connects with PDs through PoE output interfaces. The system has a PoE analog controller to turn on/off of the output power of all the PoE output interfaces. The PoE analog controller also detects the output current of all the PoE output interfaces. The system has a packet switch controller, a power state detecting circuit and a voltage conversion circuit. The voltage conversion circuit merges the power received from external power sources to generate a first voltage. The CPU calculates an output current upper limit based on the first voltage. The CPU gets a total output current from the PoE analog controller. If the total output current exceeds the output current upper limit, the CPU will turn off the PoE output interfaces according to power output priorities of the PoE output interfaces.

9 Claims, 6 Drawing Sheets

RATED POWER SUPPLY SYSTEM POWERED BY POWER OVER ETHERNET

CROSS REFERENCE TO RELATED APPLICATION

This non-provisional application claims the benefit under 35 U.S.C. § 119(e) to patent application No. 110103489 filed in Taiwan on Jan. 29, 2021, which is hereby incorporated in its entirety by reference into the present application.

BACKGROUND OF THE INVENTION

1. Field of the Invention

The present invention relates to a power supply system powered by Power over Ethernet, particularly to a rated power supply system powered by Power over Ethernet.

2. Description of the Related Art

Nowadays, Ethernet switches equipped with Power over Ethernet (PoE) functions are very popular. PoE is a very important method to supply power. The PoE technology is mainly used in places where there is presence of Ethernet and especially, at the same time, without any available power source. PoE has a plug-and-play function. By using the PoE technology, users need not look for other power sources, and thus convenience and cost-saving can be achieved. The main functions of PoE are as follows: a power sourcing equipment (PSE) provides DC power to a powered device (PD) through an Ethernet cable. A PSE is usually integrated with an Ethernet switch either as an internal circuit module or as an external device. And a PD is usually a security IP camera, a femtocell, a VoIP phone, a signage/display, a lighting, a medical equipment, a vehicle infotainment equipment, a point of sales equipment, or a Radio Frequency Identification (RFID), etc.

Presently, a PSE very often does not consider whether the total electric power it supplies to the powered devices (PDs) exceeds a rated output power that the PSE can withstand. When the PSE provides power to multiple PDs, it is ever more difficult to manage and control, so the quality of the supplied power may be poor, and the PSE may even suffer from hazardous overheating. Therefore, with the increasing popularity of PoE, there is an urgent need to solve the above-mentioned supplied power quality and risks of overheating hazards of the PSE.

SUMMARY OF THE INVENTION

In view of the above-mentioned problems, the present invention discloses a rated power supply system powered by Power over Ethernet (abbreviated as PoE hereinafter), such that a power output priority can be easily set for each of the PoE voltage output terminals of a network equipment utilizing PoE technology. And the network equipment utilizing PoE technology can automatically and properly manage the total PoE output power as well as the power provided by each of the PoE voltage output terminals to enhance the PoE supplied power quality and to decrease the risks of overheating hazards. The rated power supply system powered by PoE receives electric power from external power sources and supplies electric power to PDs via cables, and the technical features include the following:

at least one PoE output interface, each electrically connected to at least one powered device (PD) via a respective cable in one-to-one correspondence;

a PoE analog controller, including a main voltage input terminal and at least one set of main voltage output terminals, the at least one set of main voltage output terminals electrically connected to the at least one PoE output interface in one-to-one correspondence;

a PoE digital controller, electrically connected to the PoE analog controller;

a packet switch controller, having a CPU and a memory, and the packet switch controller electrically connected to the PoE digital controller;

a power state detecting circuit, electrically connected to the packet switch controller; and a voltage conversion circuit, receiving power from the at least one external power source and providing a first voltage to the power state detecting circuit, and also providing a main voltage to the main voltage input terminal of the PoE analog controller, thereby the PoE analog controller providing the main voltage to the at least one set of main voltage output terminals;

wherein, a power output priority of each of the at least one set of main voltage output terminals is written to the memory by the CPU of the packet switch controller;

wherein, the power state detecting circuit receives and converts the first voltage to a digital value of the first voltage, and sends the digital value of the first voltage to the CPU of the packet switch controller, and based on the digital value of the first voltage, the CPU calculates an output current upper limit;

wherein, after the PoE analog controller starts to provide power to the at least one PD, the CPU reads an output current value of each of the at least one set of main voltage output terminals of the PoE analog controller via the PoE digital controller, and thereby calculates a total output current of the PoE analog controller; and if the total output current of the PoE analog controller is greater than the output current upper limit, the CPU selects, among the at least one set of main voltage output terminals, a set of main voltage output terminals that is currently supplying power and having the lowest power output priority, and then the CPU turns off the selected set of main voltage output terminals via the PoE analog controller.

Preferably, the power output priority of each of the at least one set of the main voltage output terminals is either been preset or been set after the system is initialized.

Preferably, the power state detecting circuit includes an analog-to-digital converter circuit which converts the first voltage to the digital value of the first voltage.

Preferably, the power state detecting circuit includes at least one optocoupler voltage divider circuit or an analog comparator circuit, so as to convert the first voltage to a digital value and thereby to determine the voltage range of the first voltage.

Preferably, the voltage conversion circuit further includes:

a first voltage step-down circuit, receiving an intermediate voltage and outputting a digital power voltage to the PoE digital controller, the packet switch controller and the power state detecting circuit;

a second voltage step-down circuit, receiving the first voltage and outputting the intermediate voltage to the first voltage step-down circuit;

a boost circuit, receiving the first voltage and outputting the main voltage;

a connector, receiving and outputting the power of the at least one external power source; and a power merging circuit receiving the power of the at least one external power source via the connector, and outputting the first voltage to the power state detecting circuit, the second voltage step-down circuit and the boost circuit.

Preferably, the power merging circuit further includes:

at least one diode, the anode of which connects to one of the at least one external power source in one-to-one correspondence, and the cathode of which is connected in parallel to output the first voltage.

Preferably, the power merging circuit further includes:

at least one transistor, the source of which connects to one of the at least one external power source in one-to-one correspondence, and the drain of which is connected in parallel to output the first voltage;

a control circuit, receiving power from all of the at least one external power source, and thereby controlling the gate of all of the at least one transistor.

The present invention also discloses a method for rated power supply using Power over Ethernet (PoE), and the technical details are as follows:

Firstly, providing a system to receive power from at least one external power source, the system including a CPU, a PoE analog controller and at least one PoE output interface, and the at least one PoE output interface each providing power to at least one Powered Device (PD) via a respective cable, and the method including the following steps:

S1: the CPU determining and writing a power output priority of each of the at least one PoE output interface into a memory;

S2: the PoE analog controller starting to supply power to each of the at least one powered device (PD);

S3: the CPU reading a first voltage value;

S4: based on the first voltage value, the CPU calculating and storing an output current upper limit to the memory;

S5: the CPU collecting an output current of each of the at least one PoE output interface via the PoE analog controller;

S6: the CPU calculating a total output current for all of the at least one PoE output interface;

S7: the CPU reading the output current upper limit from the memory;

S8: the CPU determining whether the total output current is smaller than or equal to the output current upper limit, and if the total output current is larger than the output current upper limit, jumping to S9, otherwise if the total output current is smaller than or equal to the output current upper limit, ending the flow;

S9: the CPU reading the memory and selecting one of the at least one PoE output interface, which is currently supplying power output and has the lowest power output priority; and S10: the PoE analog controller stopping supplying power to the selected PoE output interface having the lowest power output priority and still supplying power.

In summary, when the total output current is greater than the output current upper limit, the present invention can turn off the corresponding PoE output interfaces one by one from low power output priority to high power output priority according to the power output priorities of the PoE output interfaces, so that the invention can achieve the purposes of automatically and properly managing the total PoE output power of the system as well as the power output from each of the PoE voltage output terminals, thereby improving the quality of the PoE supplied power and reducing the risks of overheating hazards.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
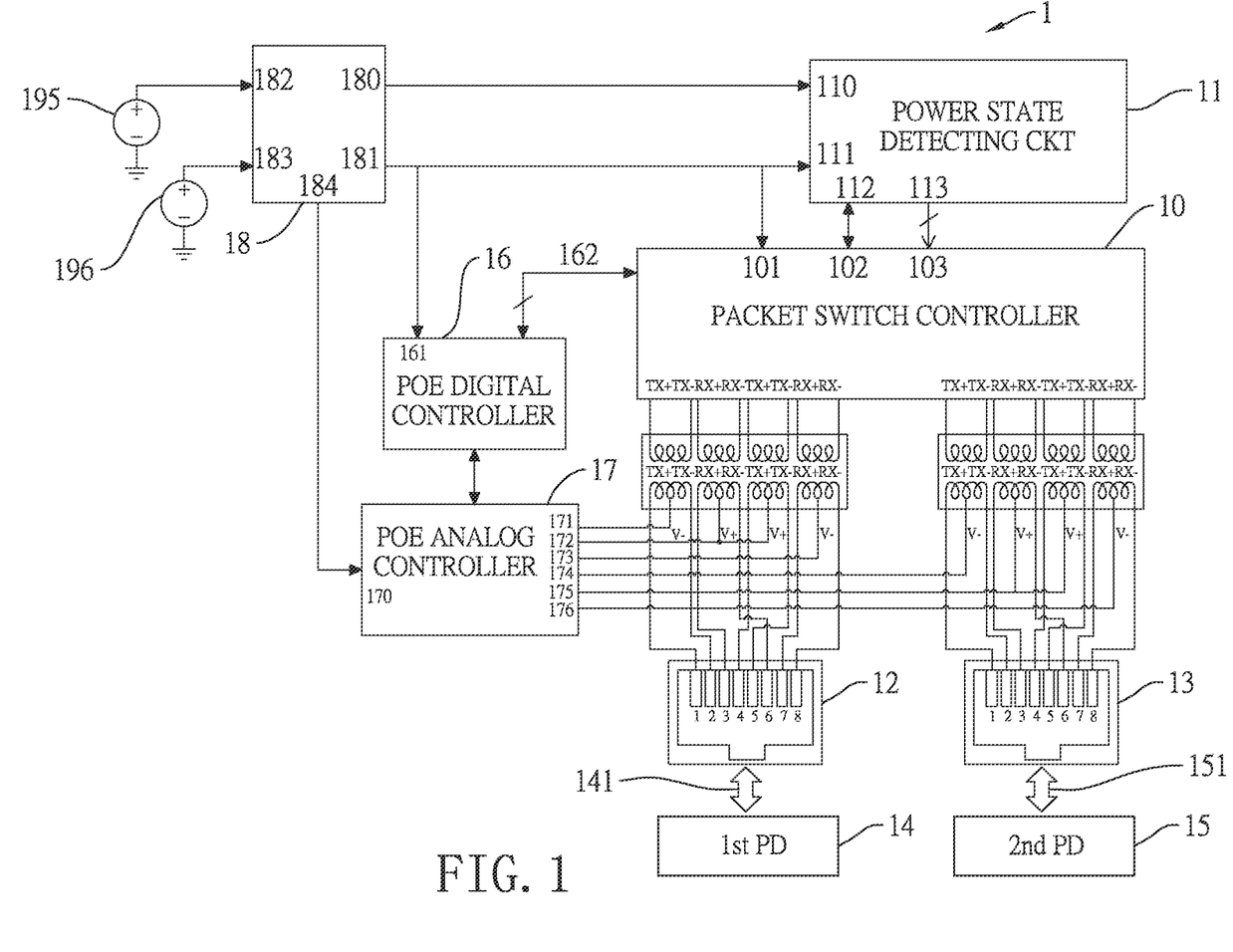
FIG. 1 is a schematic diagram for the rated power supply system of the present invention.

With reference to FIG. 1 which shows a schematic diagram for the rated power supply system of the present invention, the rated power supply system 1 of the present invention includes: a first PoE output interface 12 and a second PoE output interface 13 which are electrically connected to the external first powered device (abbreviated as PD, hereinafter) 14 and the second PD 15 via external cables 141 and 151, respectively, to provide DC power to the first PD 14 and the second PD 15. The rated power supply system of the present invention further includes: a PoE analog controller 17, a PoE digital controller 16, a packet switch controller 10, a power state detecting circuit 11, a voltage conversion circuit 18 for receiving and merging power from a first external power source 195 and a second external power source 196 to output a first voltage which is converted to a main voltage. The main voltage is output to the first PoE output interface 12 and the second PoE output interface 13 to provide power to the external first PD 14 and the second PD 15 respectively, wherein, the first external power source 195 and the second external power source 196 are both direct current (abbreviated as DC, hereinafter) power sources.

The PoE analog controller 17 has a main voltage input terminal 170 for receiving a main voltage, and the PoE analog controller 17 has six main voltage output terminals 171~176, wherein, the main voltage output terminals 171, 172, 173 constitute a first set of the main voltage output terminals and electrically connect to the first PoE output interface 12. The other main voltage output terminals 174, 175, 176 constitute a second set of the main voltage output terminals and electrically connect to the second PoE output interface 13. The PoE analog controller 17 electrically connects to the PoE digital controller 16 which electrically connects to and communicates with the packet switch controller 10 via an I2C interface wire 162. The PoE digital controller 16 has a digital power input terminal 161 to receive a digital power voltage. A combination of the PoE analog controller 17, the PoE digital controller 16, and the voltage conversion circuit 18 constitute a PSE which provides power under PoE technology. The PoE analog controller 17 can respectively turn on/off the output power of the first and the second sets of the main voltage output terminals. The PoE analog controller 17 can also measure the output currents of the first and the second sets of the main voltage output terminals.

The packet switch controller 10 has a central processing unit (CPU) and a memory (not shown in figures). The packet switch controller 10 communicates with the PoE analog controller 17 via the PoE digital controller 16, to respectively read the output current values of the first and the second sets of the main voltage output terminals and to respectively control the on/off of the power output of the first and the second sets of the main voltage output terminals. The memory can be embedded memory located in the central processing unit (CPU) or any other non-embedded memory that the central processing unit (CPU) can access, such as static memory (SRAM), dynamic memory (DRAM), or flash static memory (FLASH), etc. The packet switch controller 10 also has a digital power input terminal 101 to receive the digital power voltage, and the packet switch controller 10 also has an I2C interface 102 and a power state input terminal set 103.

The power state detecting circuit 11 has an I2C interface 112 which electrically connects with the I2C interface 102 of the packet switch controller 10. The power state detecting circuit 11 has a power state output terminal set 113 which electrically connects with the power state input terminal set 103 of the packet switch controller 10; hence, the packet switch controller 10 can get the power state information provided by the power state detecting circuit 11. The power state detecting circuit 11 has a first voltage input terminal 110 to receive the first voltage, and the power state detecting circuit 11 has a digital power input terminal 111 to receive the digital power voltage.

Figure 2A:
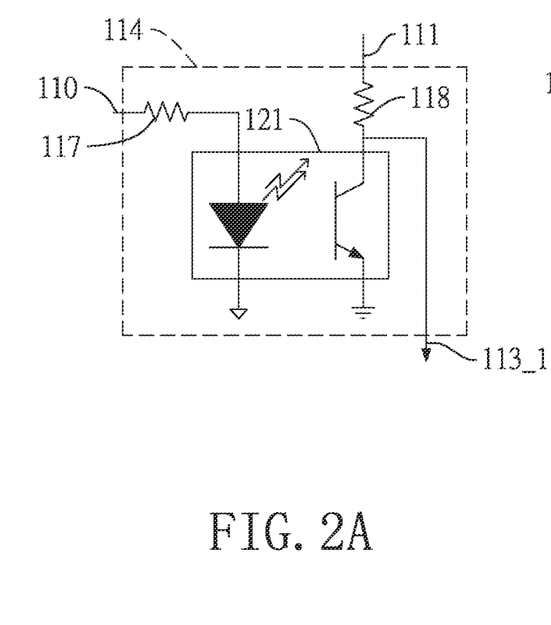
FIG. 2A is a circuit diagram of the optocoupler voltage divider circuit of the present invention.
Figure 2B:
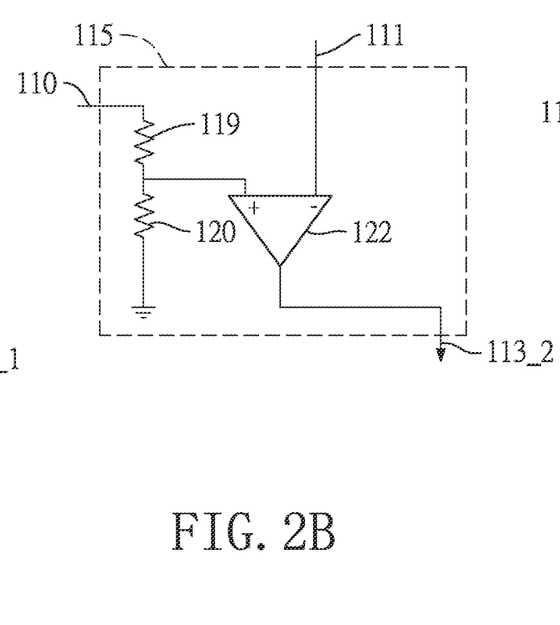
FIG. 2B is a circuit diagram of the analog comparator circuit of the present invention.
Figure 2C:
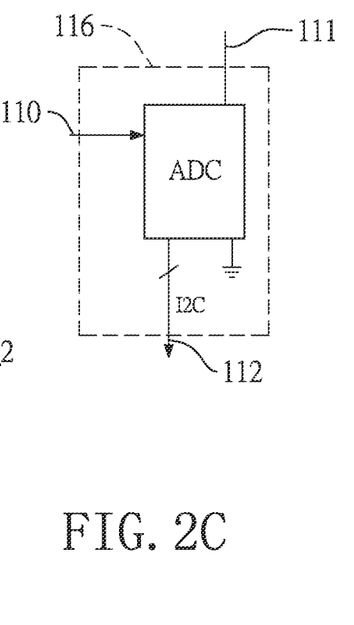
FIG. 2C is a circuit diagram of the analog-to-digital converter circuit of the present invention.

Referring to FIGS. 2A, 2B and 2C, the power state detecting circuit 11 has an optocoupler voltage divider circuit 114, an analog comparator circuit 115, and an analog-to-digital converter (abbreviate as ADC, hereinafter) circuit 116, wherein the optocoupler voltage divider circuit 114 and the analog comparator circuit 115 are both configured to sense the range of the first voltage; therefore, the optocoupler voltage divider circuit 114 and the analog comparator circuit 115 are both utilized to sense whether the first voltage is within an acceptable voltage range. The ADC converter circuit 116 is for converting the first voltage to get a digital value of the first voltage.

In one embodiment, the optocoupler voltage divider circuit 114 has an optocoupler 121, a first resistor 117 and a second resistor 118. A light emitting diode (abbreviated as LED, hereinafter) of the optocoupler 121 is serially connected with the first resistor 117. A phototransistor of the optocoupler 121 is serially connected with the second resistor 118. The first resistor 117 receives the first voltage from the first voltage input terminal 110 and accordingly generates a current to flow through the LED to emit light. The light emitted from the LED shines on the phototransistor, and then the phototransistor starts to conduct current, and the second resistor 118 receives the digital power voltage from the digital power input terminal 111, accordingly, a divided voltage is generated at a position between the phototransistor and the second resistor 118, and then the divided voltage is output to a first power state output terminal 131_1. The divided voltage is used for determining whether the first voltage exceeds a maximum acceptable voltage Vmax, and if the first voltage exceeds Vmax, the divided voltage is regarded as a "0" valued digital bit, otherwise, if the first voltage is less than or equal to Vmax, the divided voltage is regarded as a "1" valued digital bit.

In one embodiment, the analog comparator circuit 115 has a comparator 122 and a third resistor 119 serially connected with a fourth resistor 120. The third resistor 119 receives the first voltage from the first voltage input terminal 110. One end of the fourth resistor 120 is grounded and the other end of which connects to a positive input end of the comparator 122. The third resistor 119 and the fourth resistor 120, serially connected, generate a divided voltage of the first voltage. A negative input end of the comparator 122 connects to the digital power input terminal 111. As the negative input end of the comparator 122 is the digital power voltage, when the divided voltage of the first voltage is less than the digital power voltage, the output end of the comparator 122 outputs a low voltage to a second power state output terminal 113_2. Accordingly, whether the first voltage is less than a minimum acceptable voltage Vmin can be determined. In another words, if the first voltage is less than Vmin, the voltage of the second power state output terminal 113_2 is regarded as a "0" valued digital bit, otherwise, if the first voltage is larger than or equal to Vmin, the voltage of the second power state output terminal 113_2 is regarded as a "1" valued digital bit.

The aforementioned first power state output terminal 131_1 and second power state output terminal 113_2 constitute a power state output terminal set 113. The power state output terminal set 113 sends the state of the first voltage at the first voltage input terminal 110 to the packet switch controller 10, and then the packet switch controller 10 can determine whether the first voltage is within a normal voltage range, wherein the state of the first voltage means that whether the first voltage is greater than the maximum acceptable voltage Vmax, whether the first voltage is less than or equal to the minimum acceptable voltage Vmin, or whether the first voltage is between Vmax and Vmin. Likewise, in one embodiment, a combination of multiple optocoupler voltage divider circuits 114 or multiple analog comparator circuits 115 can also provide the voltage state of the first voltage to the packet switch controller 10, and the packet switch controller 10 can accordingly determine whether the first voltage is within a voltage range narrower than the aforementioned voltage range of (Vmax, Vmin).

In one embodiment, the ADC converter circuit 116 is connected to the I2C interface 112 which is further electrically connected to the I2C interface 102 of the packet switch controller 10. The ADC converter circuit 116 receives the first voltage from the first voltage input terminal 110 and the digital power voltage from the digital power input terminal 111. After the analog to digital conversion, the ADC circuit 116 obtains the digital value of the first voltage, and then sends the digital value of the first voltage to the packet switch controller 10 via the I2C interface 112. Accordingly, the packet switch controller 10 can obtain the precise voltage value of the first voltage. After the packet switch controller 10 obtains the voltage value of the first voltage and the output currents of the first set and the second set of the main voltage output terminals of the PoE analog controller 17, a total output current of the first and the second PoE output interfaces 12, 13 as well as an output current upper limit of a PoE total output current can both be calculated.

Figure 3:
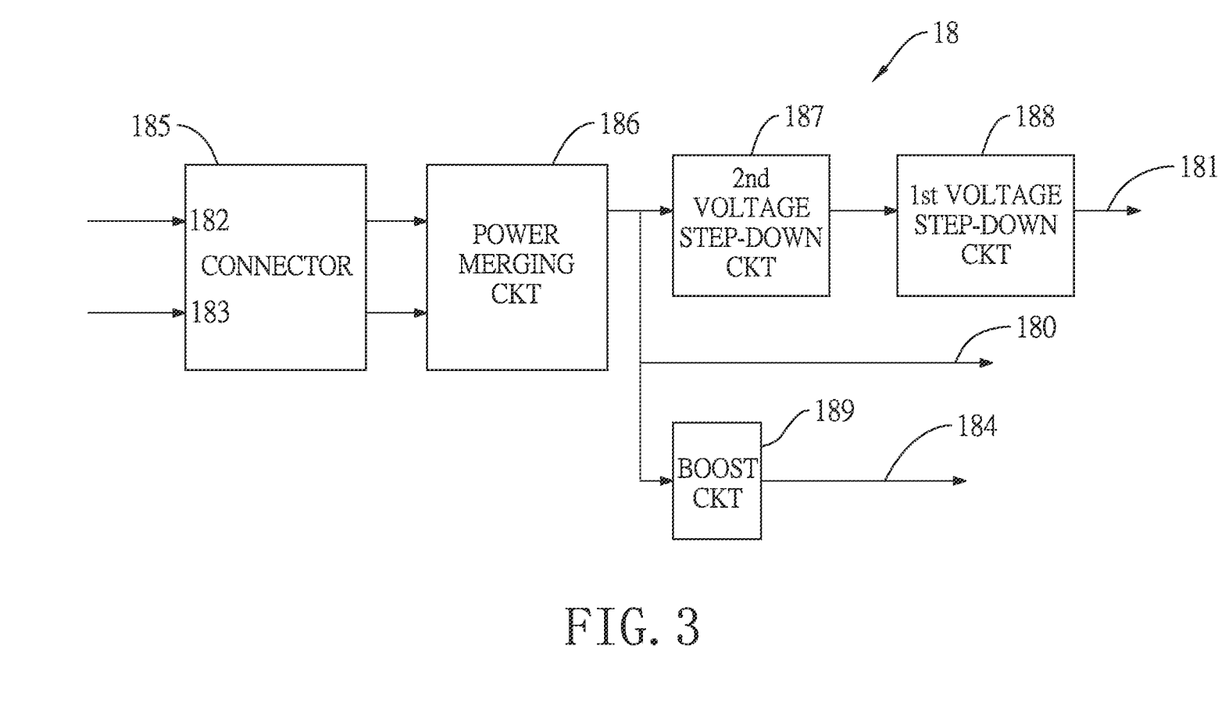
FIG. 3 is a schematic diagram of the voltage converter circuit of the present invention.

Referring to FIG. 3 which shows a schematic diagram for the voltage conversion circuit of the present invention, the voltage conversion circuit 18 has a first voltage step-down circuit 188, a second voltage step-down circuit 187, a boost circuit 189, a power merging circuit 186 and a connector 185. The connector 185 has a first external power source input terminal 182 and a second external power source input terminal 183 which are respectively connected to the first external power source 195 and the second external power source 196. The first and the second external power sources 195, 196 respectively have a first external voltage and a second external voltage. The power merging circuit 186 receives the first external voltage and the second external voltage via the connector 185 and outputs the first voltage to the power state detecting circuit 11, the second voltage step-down circuit 187 and the boost circuit 189.

Figure 4A:
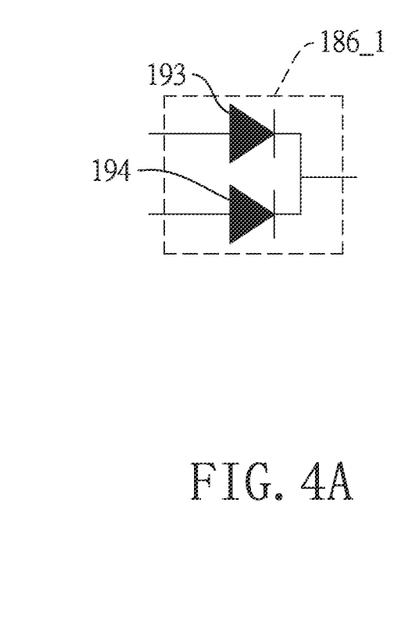
FIG. 4A is a circuit diagram of the first merging circuit of the present invention.

Referring to FIG. 4A which shows a schematic diagram for the first merging circuit of the present invention, in one embodiment, the power merging circuit 186 can be the first merging circuit 186_1 which has a first diode 193 and a second diode 194. The anodes of the first diode 193 and the second diode 194 are respectively connected to the first external power source 195 and the second external power source 196, and the cathodes of the first diode 193 and the second diode 194 are connected in parallel to output the first voltage. Accordingly, the first external voltage and a second external voltage generate the first voltage via the first merging circuit 186_1. In principle, only the higher one of the first external voltage and the second external voltage will provide output current while the lower one of which will not provide the output current. However, when the voltage difference between the first external voltage and the second external voltage is small, for example less than 0.1V, or when the loading is large, the smaller one of which may still provide a fraction of the output current.

Figure 4B:
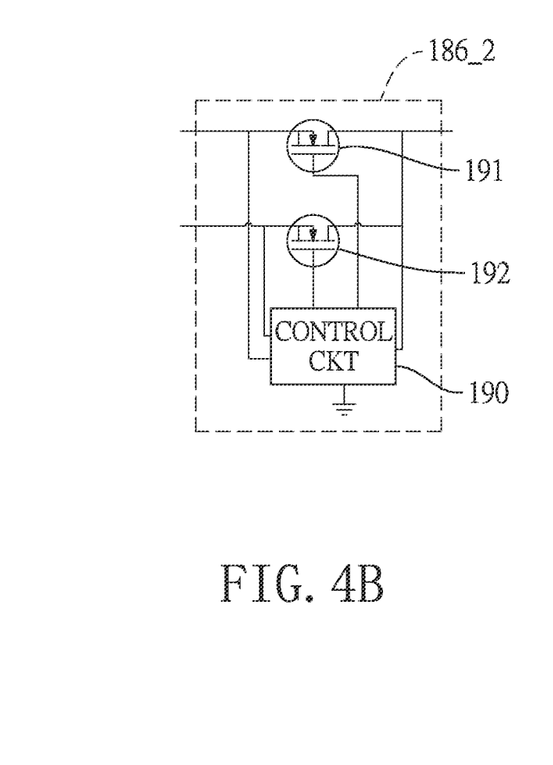
FIG. 4B is a circuit diagram of the second merging circuit of the present invention.

Referring to FIG. 4B which shows a schematic diagram for the second merging circuit of the present invention, in one embodiment, the power merging circuit 186 can be the second merging circuit 186_2. The second merging circuit 186_2 has a first transistor 191 and a second transistor 192. The first transistor 191 and the second transistor 192 can be metal oxide semiconductor field effect transistors (MOSFET), and the sources of the first transistor 191 and the second transistor 192 are respectively connected to the first external power source 195 and the second external power source 196. The drains of the first transistor 191 and the second transistor 192 are connected in parallel to output the first voltage. The second merging circuit 186_2 has a control circuit 190 receiving the first external voltage and the second external voltage and thereby controlling the gates of the first transistor 191 and the second transistor 192 respectively, so as to avoid electric short between the first external power source 195 and the second external power source 196 and to let the first external power source 195 and the second external power source 196 both provide power simultaneously when the voltage difference between the two is small or when loading is large.

Figure 5A:
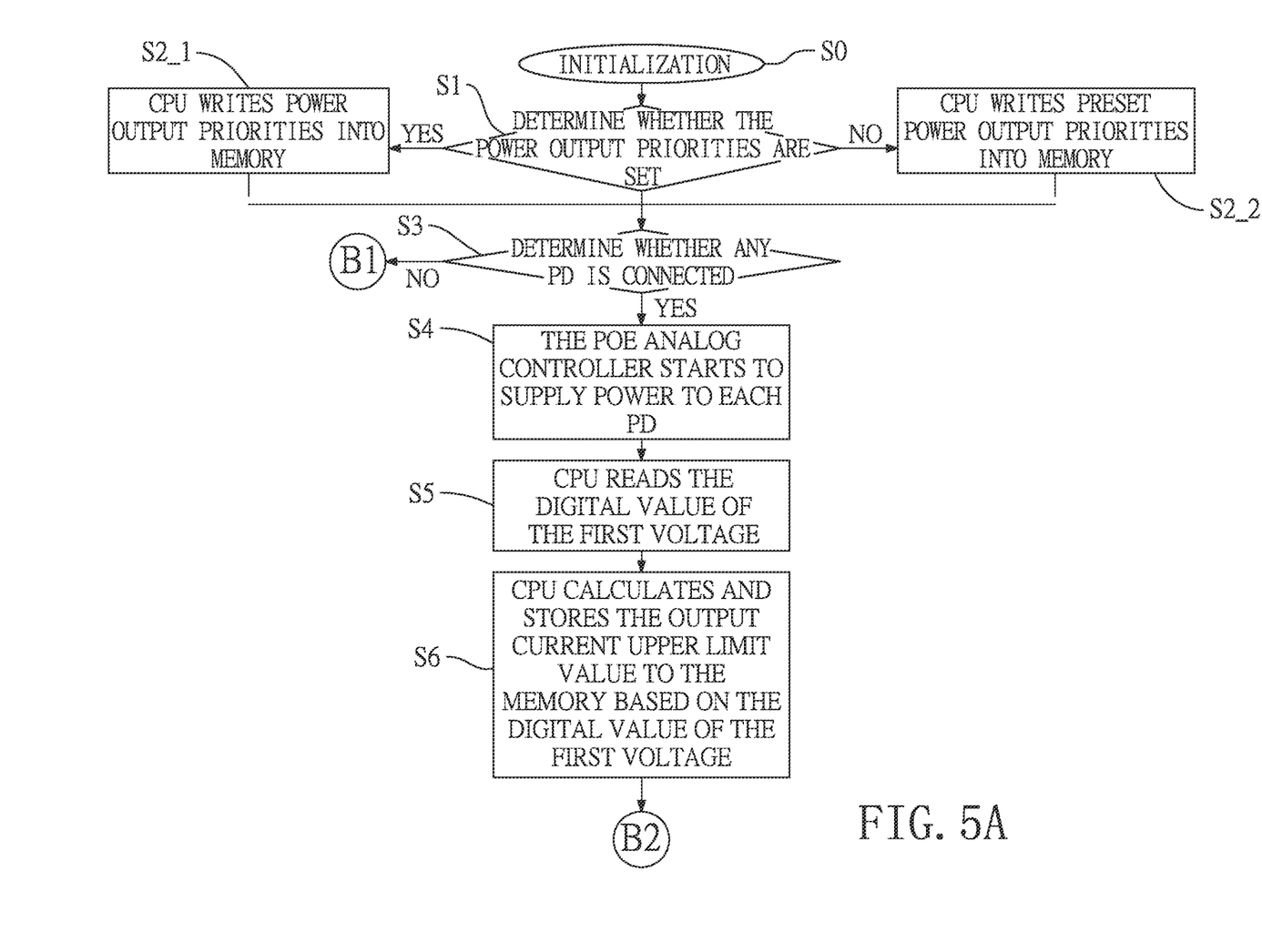
FIG. 5A-5B illustrate a flowchart of the rated power supply system of the present invention.
Figure 5B:
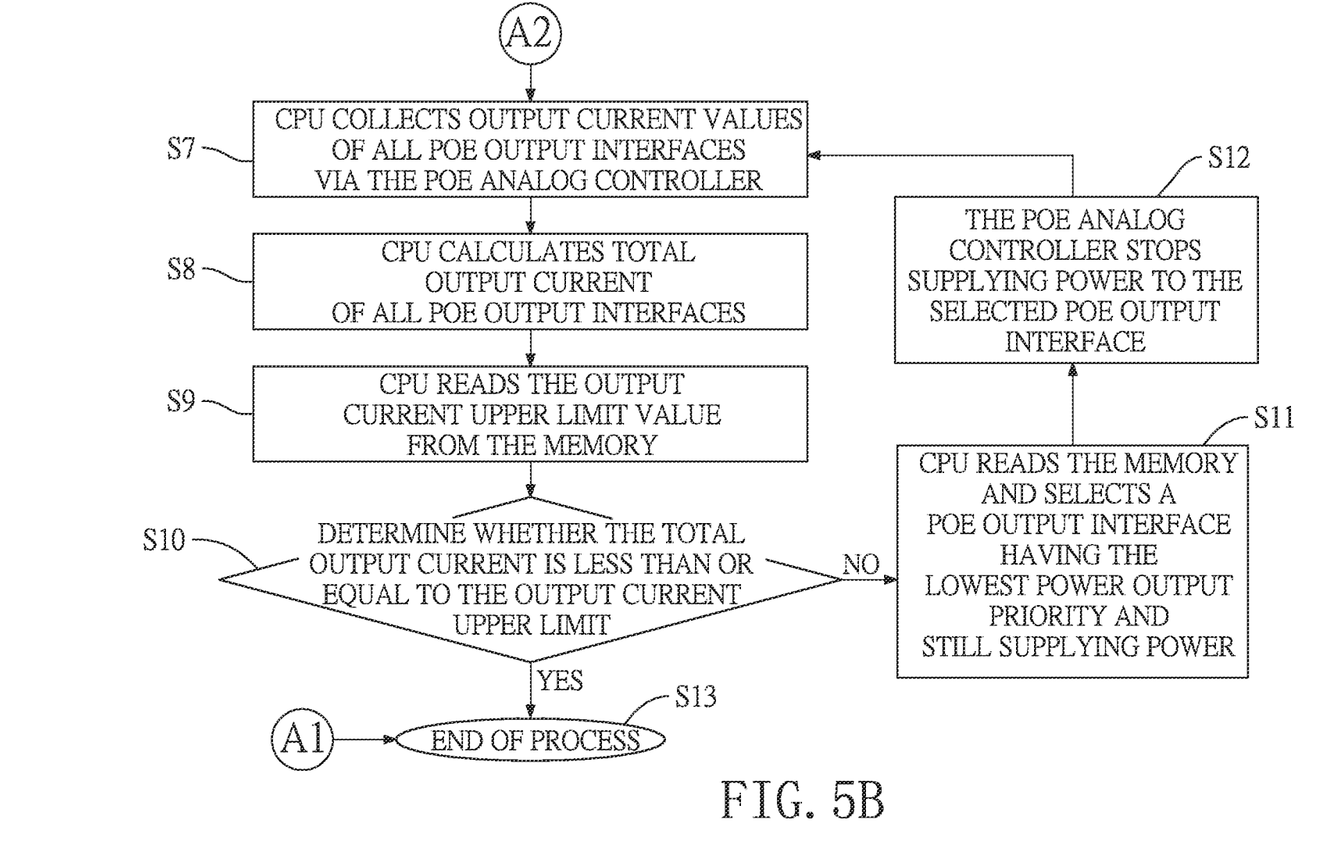

Referring to FIGS. 5A-5B which illustrate a flowchart of the present invention, the flowchart includes the following steps:

Step 0: system initialization;

Step 1: the CPU determines whether the power output priority of each PoE output interface is set, if the power output priority of each PoE output interface is set, jumps to step 2_1, if any power output priority is not yet set, jumps to step 2_2;

Step 2_1: the CPU writes a power output priority of each PoE output interface into the memory, and jumps to step 3;

Step 2_2: the CPU writes a preset power output priority of each PoE output interface into the memory, and jumps to step 3;

Step 3: the PoE analog controller 17 detects whether any powered device (PD) is connected, if no powered device (PD) is connected, the process ends;

Step 4: the PoE analog controller 17 starts to supply power to each powered device (PD);

Step 5: the CPU reads the digital value of the first voltage;

Step 6: based on the digital value of the first voltage, the CPU calculates an output current upper limit value of the supply current and stores the output current upper limit value to the memory;

Step 7: the CPU collects an output current value of each PoE output interface of the PoE analog controller 17;

Step 8: the CPU calculates a total output current of all PoE output interfaces;

Step 9: the CPU reads the output current upper limit value from the memory;

Step 10: the CPU determines whether the total output current is less than or equal to the output current upper limit, if the total output current is greater than the output current upper limit, jumps to step 11, and if the total output current is less than or equal to the output current upper limit, the process ends;

Step 11: among all PoE output interfaces, the CPU reads the memory and selects a PoE output interface which is still supplying power and has the lowest power output priority;

Step 12: the PoE analog controller 17 stops supplying power to the selected PoE output interface having the lowest power output priority and still supplying power, and jumps to step 7.

From the above steps, it can be seen that each PoE output interface in the rated power supply system of the present invention must be set with a power output priority, and the rated power supply system of the present invention must also calculate the output current upper limit value of the output current based on the first voltage. Therefore, when the total output current of all PoE output interfaces exceeds the output current upper limit value, corresponding PoE output interfaces can be turned off one by one from low power output priority to high power output priority according to the power output priority set for each PoE output interface. In this way, automatic and proper management of the overall PoE output power of the system and the power supply of each PoE voltage output terminal can be achieved according to the present invention, thereby fulfilling the purposes of the present invention to improve the PoE power supply quality and to reduce the risk of overheating hazards.

In one embodiment, the present invention may be equipped with only one of the aforementioned first external power source input terminal 182 or second external power source input terminal 183, and in this way, the purpose of the invention can still be fulfilled.

In one embodiment, the present invention may be equipped with only one of the aforementioned first PoE output interface 12 or second PoE output interface 13, and in this way, the purpose of the invention can still be fulfilled.

In one embodiment, the present invention may be equipped with only one of the aforementioned first external power source input terminal 182 or second external power source input terminal 182. And the present invention may be equipped with only one of the aforementioned first PoE output interface 12 or the second PoE output interface 13, and in this way, the purpose of the invention can still be fulfilled.

In one embodiment, in addition to the aforementioned first PoE output interface 12 and the second PoE output interface 13, the present invention may have more PoE output interfaces, and in this way, the purpose of the invention can still be fulfilled.

In one embodiment, in addition to the aforementioned first PoE output interface 12 and second PoE output interface 13, the present invention may have more PoE output interfaces, and the present invention may be equipped with only one of the aforementioned first external power source input terminal 182 and second external power source input terminal 182, and in this way, the purpose of the invention can still be fulfilled.

In accordance with the above-mentioned technical ideas of the present invention, in one embodiment, in addition to the aforementioned first external power source input terminal 182 or second external power source input terminal 182, the present invention may have more external power source input terminals, and in this way, the purpose of the invention can still be fulfilled.

What is claimed is:

1. A rated power supply system powered by Power over Ethernet (PoE) receiving power from at least one external power source and each providing power to at least one powered device (PD) via a respective cable, and the rated power supply system powered by PoE including:
    at least one PoE output interface, electrically connected to the at least one powered device (PD) via the respective cable in one-to-one correspondence;
    a PoE analog controller, including a main voltage input terminal and at least one set of main voltage output terminals, the at least one set of main voltage output terminals electrically connected to the at least one PoE output interface in one-to-one correspondence;
    a PoE digital controller, electrically connected to the PoE analog controller;
    a packet switch controller, having a central processing unit (CPU) and a memory, and the packet switch controller electrically connected to the PoE digital controller;
    a power state detecting circuit, electrically connected to the packet switch controller; and
    a voltage conversion circuit, receiving power from the at least one external power source and providing a first voltage to the power state detecting circuit, and also providing a main voltage to the main voltage input terminal of the PoE analog controller, thereby the PoE analog controller providing the main voltage to the at least one set of main voltage output terminals;
    wherein, a power output priority of each of the at least one set of main voltage output terminals is written to the memory;
    wherein, the power state detecting circuit receives and converts the first voltage to a digital value of the first voltage, and sends the digital value of the first voltage to the CPU of the packet switch controller, and based on the digital value of the first voltage, the CPU calculates an output current upper limit.

2. The system as claimed in claim 1, wherein, after the PoE analog controller starts to supply power to the at least one PD, the CPU reads an output current value of each of the at least one set of main voltage output terminals of the PoE analog controller via the PoE digital controller, and thereby calculates a total output current of the PoE analog controller; and if the total output current of the PoE analog controller is greater than the output current upper limit, the CPU selects, among the at least one set of main voltage output terminals, a set of main voltage output terminals that is currently supplying power and having the lowest power output priority, and then the CPU turns off the selected set of main voltage output terminals via the PoE analog controller.

3. The system as claimed in claim 1, wherein, the power output priority of each of the at least one set of the main voltage output terminals is either been preset or been set after the system is initialized.

4. The system as claimed in claim 1, wherein, the power state detecting circuit includes an analog-to-digital converter circuit which converts the first voltage to the digital value of the first voltage.

5. The system as claimed in claim 1, wherein, the power state detecting circuit includes at least one optocoupler voltage divider circuit or an analog comparator circuit, so as to convert the first voltage to the digital value and thereby to determine a voltage range of the first voltage.

6. The system as claimed in claim 1, wherein, the voltage conversion circuit further includes:
    a first voltage step-down circuit, receiving an intermediate voltage and outputting a digital power voltage to the PoE digital controller, the packet switch controller and the power state detecting circuit;
    a second voltage step-down circuit, receiving the first voltage and outputting the intermediate voltage to the first voltage step-down circuit;
    a boost circuit, receiving the first voltage and outputting the main voltage;
    a connector, receiving and outputting the power of the at least one external power source; and
    a power merging circuit receiving the power of the at least one external power source via the connector, and outputting the first voltage to the power state detecting circuit, the second voltage step-down circuit and the boost circuit.

7. The system as claimed in claim 6, wherein, the power merging circuit further includes:
    at least one diode, the anode of which connects to one of the at least one external power source in one-to-one correspondence, and the cathode of which is connected in parallel to output the first voltage.

8. The system as claimed in claim 6, wherein, the power merging circuit further includes:
    at least one transistor, the source of which connects to one of the at least one external power source in one-to-one correspondence, and the drain of which is connected in parallel to output the first voltage;
    a control circuit, receiving power from all of the at least one external power source, and thereby controlling the gate of all of the at least one transistor.

9. A method for rated power supply using Power over Ethernet (PoE), providing a system to receive power from at least one external power source, the system including a CPU, a PoE analog controller and at least one PoE output interface, and the at least one PoE output interface each providing power to at least one Powered Device (PD) via a respective cable, and the method including the following steps:
    S1: the CPU determining and writing a power output priority of each of the at least one PoE output interface into a memory;
    S2: the PoE analog controller starting to supply power to each of the at least one powered device (PD);
    S3: the CPU reading a first voltage value;
    S4: based on the first voltage value, the CPU calculating and storing an output current upper limit to the memory;

S5: the CPU collecting an output current of each of the at least one PoE output interface via the PoE analog controller;

S6: the CPU calculating a total output current for all of the at least one PoE output interface;

S7: the CPU reading the output current upper limit from the memory;

S8: the CPU determining whether the total output current is smaller than or equal to the output current upper limit, and if the total output current is larger than the output current upper limit, jumping to S9, otherwise if the total output current is smaller than or equal to the output current upper limit, ending the flow;

S9: the CPU reading the memory and selecting one of the at least one PoE output interface, which is currently supplying power output and has the lowest power output priority;

S10: the PoE analog controller stopping supplying power to the selected PoE output interface having the lowest power output priority and still supplying power.

* * * * *